(12) United States Patent
Yoshida

(10) Patent No.: US 11,770,602 B2
(45) Date of Patent: Sep. 26, 2023

(54) APPARATUS, CONTROL METHOD THEREFOR, AND STORAGE MEDIUM

(71) Applicant: CANON KABUSHIKI KAISHA, Tokyo (JP)

(72) Inventor: Takashi Yoshida, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 282 days.

(21) Appl. No.: 17/372,593

(22) Filed: Jul. 12, 2021

(65) Prior Publication Data

US 2022/0021817 A1 Jan. 20, 2022

(30) Foreign Application Priority Data

Jul. 16, 2020 (JP) .................................. 2020-122348

(51) Int. Cl.
*H04N 23/63* (2023.01)
*H04N 23/611* (2023.01)
*G06F 3/16* (2006.01)
*G06F 3/01* (2006.01)
*G06F 3/0488* (2022.01)

(52) U.S. Cl.
CPC ......... *H04N 23/632* (2023.01); *H04N 23/611* (2023.01); *H04N 23/635* (2023.01); *G06F 3/013* (2013.01); *G06F 3/0488* (2013.01); *G06F 3/167* (2013.01)

(58) Field of Classification Search
CPC ......... H04N 5/232945; H04N 5/23219; H04N 5/232935; H04N 5/23212; G06F 3/013; G06K 9/2081; G06K 9/00342; G06T 7/2053
See application file for complete search history.

(56) References Cited

U.S. PATENT DOCUMENTS

2016/0080633 A1\* 3/2016 Hong .................... H04N 23/611
 348/169
2017/0104938 A1\* 4/2017 Shimosato ............. H04N 23/61

FOREIGN PATENT DOCUMENTS

JP 2015022207 A 2/2015
JP 2018074200 A 5/2018

\* cited by examiner

*Primary Examiner* — Xi Wang
(74) *Attorney, Agent, or Firm* — ROSSI, KIMMS & McDOWELL LLP

(57) ABSTRACT

An apparatus receives an input of a position to a display unit and receives a moving instruction for moving a selected position corresponding to the input position on the display unit. The apparatus controls to, in a case where an object area including the input position has a first size, move the selected position in accordance with a moving operation of a first operation amount and, in a case where the object area has a second size that is smaller than the first size, move the selected position by a second movement amount smaller than the first movement amount in accordance with the moving operation of the first operation amount.

16 Claims, 5 Drawing Sheets

APPARATUS, CONTROL METHOD THEREFOR, AND STORAGE MEDIUM

BACKGROUND OF THE INVENTION

Field of the Invention

The present invention relates to an apparatus, a control method therefor, and a storage medium.

Description of the Related Art

There is a known technique that detects the line-of-sight position of a user and selects a measurement area on an image based on the detected line-of-sight position. It is disclosed in Japanese Patent Laid-Open No. 2018-74200 that a measurement area is selected based on the line-of-sight position, the selected measurement area is moved at a first speed via an operation on an operation member in a case where the measurement area is inside a predetermined range, and the measurement area is moved at a faster second speed in other cases.

According to the technique disclosed in Japanese Patent Laid-Open No. 2018-74200, when an operation is performed using the operation member, the speed of movement of the measurement area changes in accordance with the measurement area selected based on the line-of-sight position. Therefore, in a case where the area selected based on the first line-of-sight position is outside the predetermined range, there is a possibility that the speed of movement of the measurement area increases and the operation becomes difficult to perform in a case where a fine movement is to be made.

SUMMARY OF THE INVENTION

The present disclosure has been made in consideration of the aforementioned issues, and realizes a technique that can improve the operability when a user selects a position inside an image.

In order to solve the aforementioned problems, one aspect of the present disclosure provides an apparatus, comprising at least one memory and at least one processor which function as: a first instruction unit configured to be capable of receiving an input of a position to a display unit; a second instruction unit configured to be capable of receiving a moving instruction for moving a selected position corresponding to the input position on the display unit whose input has been received by the first instruction unit; and a control unit configured to perform control to in a case where an object area including the input position has a first size, move the selected position by a first movement amount in accordance with a moving operation of a first operation amount performed with respect to the second instruction unit, and in a case where the object area has a second size that is smaller than the first size, move the selected position by a second movement amount smaller than the first movement amount in accordance with the moving operation of the first operation amount performed with respect to the second instruction unit.

Another aspect of the present disclosure provides, a control method for an apparatus that includes a first input device configured to be capable of receiving an input of a position to a display device and a second input device configured to be capable of receiving a moving instruction for moving a selected position corresponding to the input position on the display device whose input has been received by the first input device, the control method comprising: performing control to in a case where an object area including the input position has a first size, move the selected position by a first movement amount in accordance with a moving operation of a first operation amount performed with respect to the second input device, and in a case where the object area has a second size that is smaller than the first size, move the selected position by a second movement amount smaller than the first movement amount in accordance with the moving operation of the first operation amount performed with respect to the second input device.

Still another aspect of the present disclosure provides, a non-transitory computer readable storage medium storing a program for causing a computer to execute a control method of an apparatus comprising a first input device configured to be capable of receiving an input of a position to a display device and a second input device configured to be capable of receiving a moving instruction for moving a selected position corresponding to the input position on the display device whose input has been received by the first input device, the control method comprising: performing control to in a case where an object area including the input position has a first size, move the selected position by a first movement amount in accordance with a moving operation of a first operation amount performed with respect to the second input device, and in a case where the object area has a second size that is smaller than the first size, move the selected position by a second movement amount smaller than the first movement amount in accordance with the moving operation of the first operation amount performed with respect to the second input device.

According to the present invention, the operability can be improved when a user selects a position inside an image.

Further features of the present invention will become apparent from the following description of exemplary embodiments (with reference to the attached drawings).

DESCRIPTION OF THE EMBODIMENTS

First Embodiment

Figure 1A:
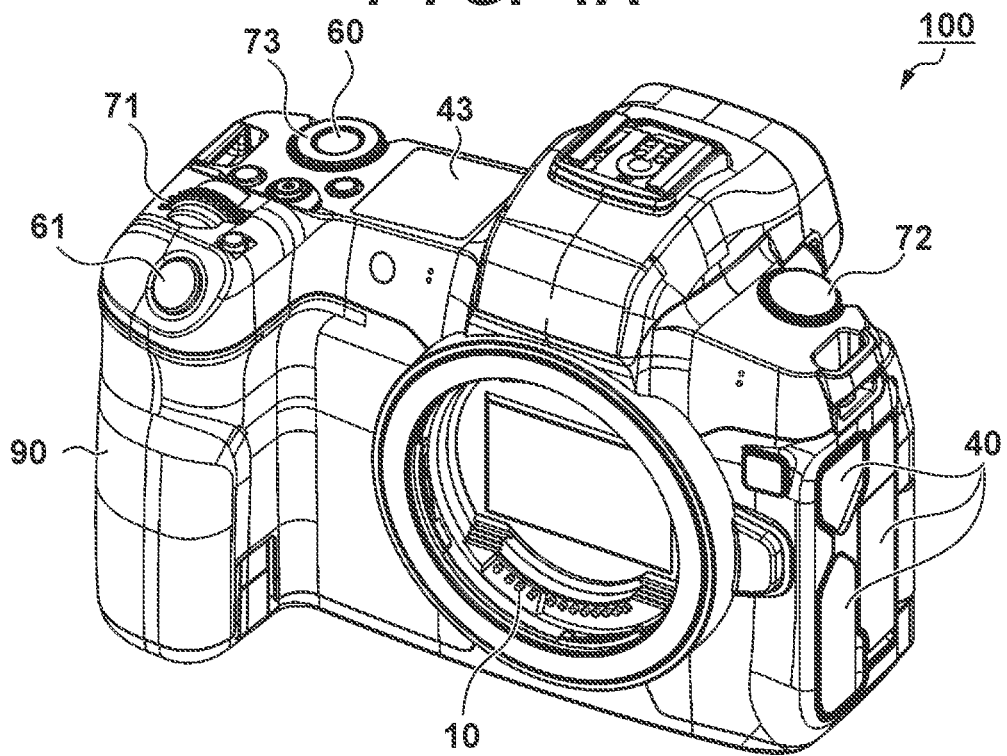
FIGS. 1A and 1B are diagrams showing external views of a digital camera as one example of an image capturing control apparatus according to an embodiment of the present invention.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

(Configuration of Digital Camera)

FIG. 1 is a block diagram showing an exemplary functional configuration of a digital camera 100 as one example of an image capturing control apparatus of the present embodiment. Note that one or more of the function blocks shown in FIG. 1 may be realized by hardware, such as an ASIC and a programmable logic array (PLA), or may be realized by a programmable processor, such as a CPU and an MPU, executing software. Furthermore, they may be realized by a combination of software and hardware.

Figure 1B:
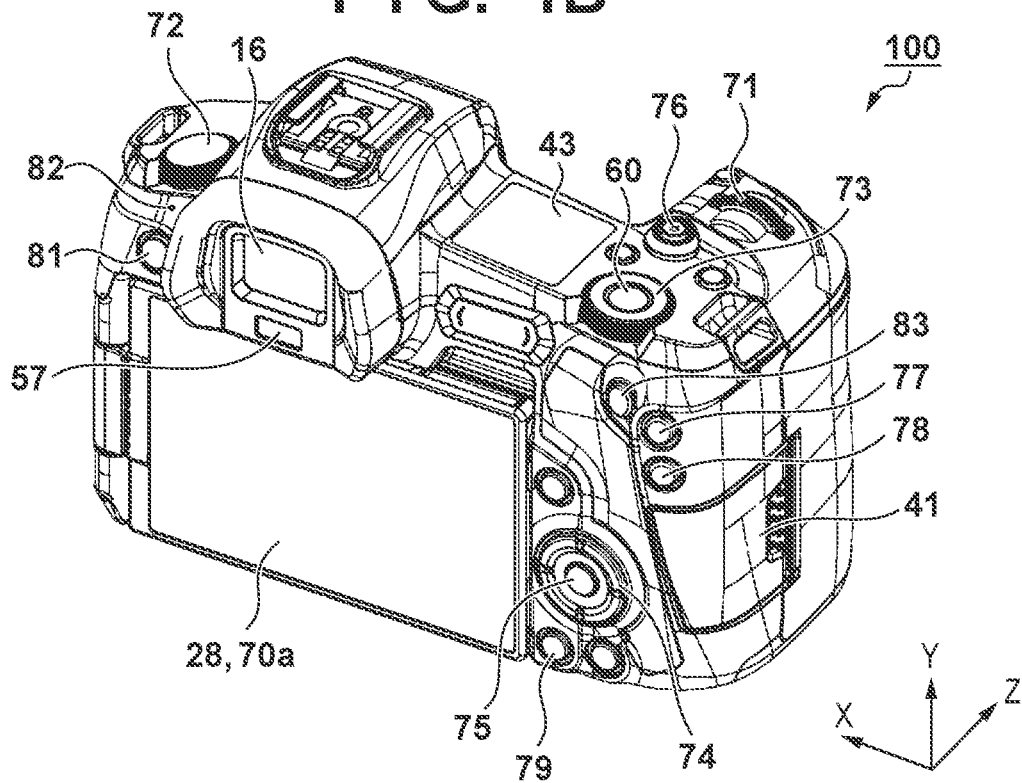

FIG. 1A and FIG. 1B show external views of a digital camera 100 according to the present embodiment. FIG. 1A is a frontal perspective view of the digital camera 100, and FIG. 1B is a rear perspective view of the digital camera 100.

The digital camera 100 allows a later-described lens unit 150 to be attached thereto and detached therefrom, and includes a later-described image capturing unit 22 that converts an optical object image (optical image) that has passed through the lens unit 150 into electronic image data.

A rear display unit 28 is provided on a rear surface of the digital camera 100, and can display images and various types of information. A touchscreen 70a can detect a touch operation and a drag operation that have been performed with respect to a display surface (operation surface) of the rear display unit 28.

A later-described eye proximity unit 16 is provided at the center of the rear surface side of the digital camera 100. Also, an out-of-viewfinder display unit 43, which is provided on a top portion of the digital camera 100, displays various setting values of the digital camera 100, including the shutter speed and the f-number.

A shutter button 61 is an operation button, and performs later-described shooting processing when depressed by a user. Note that a first position (later-described first shutter switch 62) and a second position (later-described second shutter switch 64) exist in the direction of depression of the shutter button 61. An operation of determining the shutter speed and the f-number is performed at the first position, and later-described shooting processing is performed at the second position. In the example of the present embodiment, the second position is set at a position deeper than the first position.

A mode changeover switch 60 is an operation member for switching among still image shooting modes or moving image shooting modes. For example, the still image shooting modes include an auto shooting mode in which the digital camera 100 automatically controls shooting operations, a manual shooting mode in which the user can finely set the shutter speed and the f-number, and so forth.

Terminal covers 40 are covers that protect connectors (not illustrated) that connect between an external device and the digital camera 100 via a connection cable.

A main electronic dial 71 is a rotary operation member; the shutter speed, the f-number, and the like can be changed by rotating the main electronic dial 71.

A power switch 72 is an operation member that can, in response to an operation of depressing the power switch 72, activate the digital camera 100 and place the same into a shooting standby state, and switch the digital camera 100 to an inoperative state after shooting has ended.

A sub electronic dial 73 is a rotary operation member, and can scroll displayed images one after another in response to an operation of rotating the sub electronic dial 73 in a state where a shot image is displayed on the rear display unit 28.

A cross key 74 is, for example, a disc-shaped four-direction key with up, down, left, and right portions that can each be depressed; for example, when a distance measurement point at which an object has been brought into focus is to be moved during shooting, the distance measurement point can be moved in accordance with an operation performed on the direction key.

A SET button 75 is an operation button, and is mainly used as a unit that determines a selected item. A moving image button 76 is used for an instructional operation for starting and stopping shooting (recording) of moving images. An AE lock button 77 is an operation button that can, when depressed in the shooting standby state, fix an exposure value indicating the brightness of an object to the exposure value at that time.

A magnification button 78 is, for example, an operation button for enlarging a part of an image displayed on the rear display unit 28; each time the magnification button 78 is depressed, a screen is switched among normal display, onefold, fivefold, and tenfold. After the magnification button 78 has been depressed, for example, performing an operation of rotating the main electronic dial 71 clockwise allows an image displayed on the rear display unit 28 to be enlarged, whereas performing an operation of rotating the main electronic dial 71 counterclockwise allows an image displayed on the rear display unit 28 to be reduced. Furthermore, also in a reproduction mode in which a recorded image is displayed, the reproduced image can be enlarged or reduced.

A reproduction button 79 is an operation button; depressing the reproduction button 79 enables a switchover from the shooting standby state to the reproduction mode, or from the reproduction mode to the shooting standby state.

A menu button 81 is an operation button; depressing the menu button 81 enables various types of settable items, such as the recording quality and date, to be displayed on the rear display unit 28.

A microphone 82 is a sound input microphone for recognizing a sound produced by an operator. Although the microphone 82 is arranged on the rear surface of the digital camera 100 in FIG. 1, it is not particularly limited to being arranged on the rear surface side of the digital camera 100 as long as it can fulfill the sound input function.

A line-of-sight input start button 83 is a button for starting an AF operation at an AF selection frame position that has been selected. A communication terminal 10 is a communication terminal that is intended for the digital camera 100 to communicate with the later-described lens unit 150 (attachable and detachable).

The eye proximity unit 16, which is a constituent element of an eye proximity structure 171, is an eye proximity unit to which an eye comes in proximity in a case where the user looks through the digital camera 100. The user can visually recognize a video displayed on a later-described intra-finder display unit (hereinafter, EVF) 29, which is provided internally, by looking through the eye proximity unit 16 by bringing his/her eye in proximity thereto. An eye proximity detection unit 57 is an eye proximity detection sensor that detects whether an eye of a photographer is in proximity to the eye proximity unit 16.

A cover 41 is a cover that is openable and closable when a later-described attachable and removable recording medium 200 is attached and removed. A grip unit 90 is a section at which the user grasps the digital camera 100, and has a shape that is easily gripped by the right hand when the user grasps the digital camera 100. The shutter button 61 and the main electronic dial 71 are arranged at the positions where they can be operated by the pointing finger of the right hand in a state where the digital camera 100 is held while the grip unit 90 is being gripped by the right hand. Furthermore, the sub electronic dial 73 is arranged at the position where it can be operated by the thumb of the right hand in the same state.

(Exemplary Functional Configuration of Digital Camera)

Figure 2:
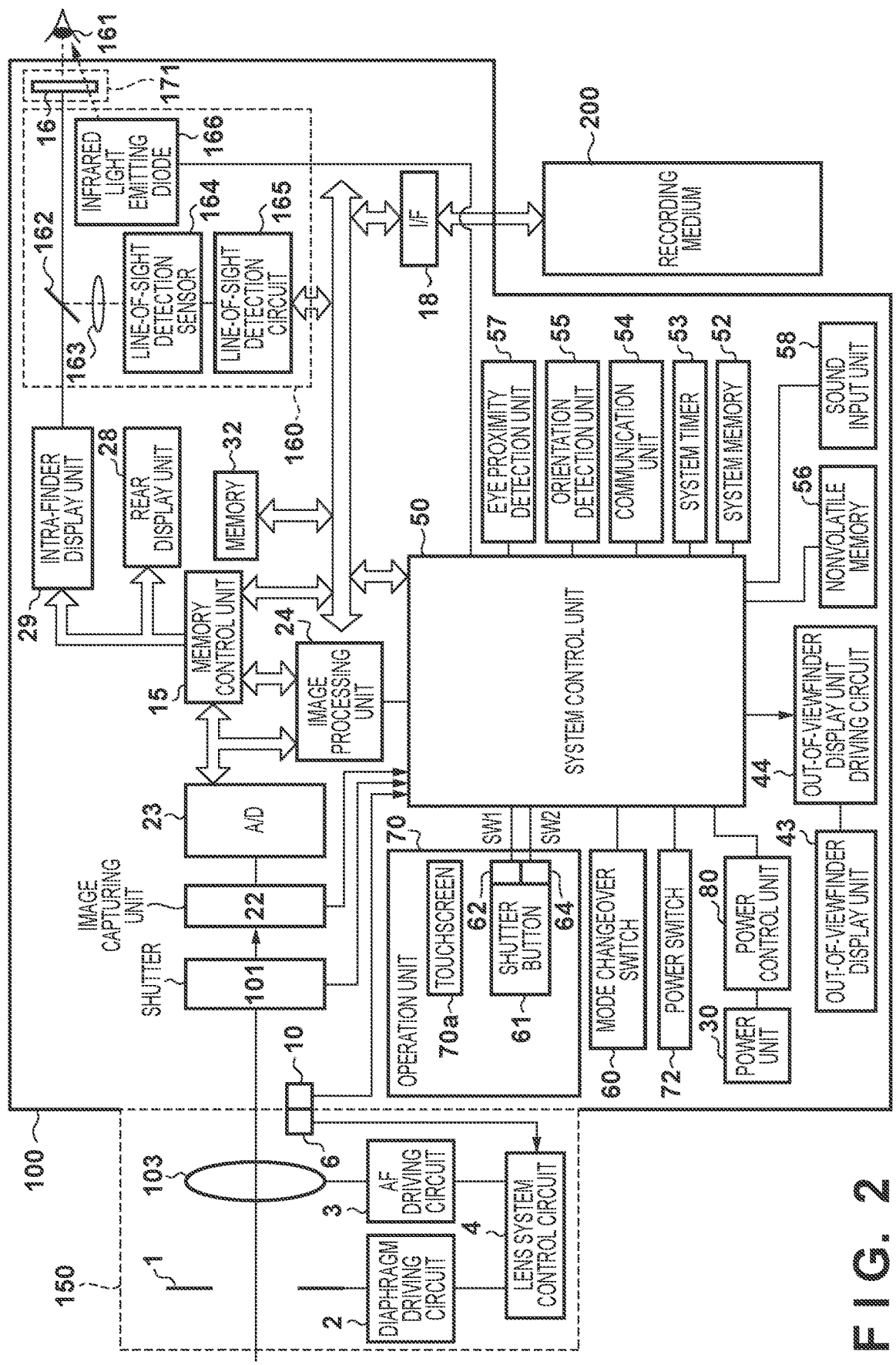
FIG. 2 is a block diagram showing an exemplary functional configuration of the digital camera according to the present embodiment.

Next, an exemplary functional configuration of the digital camera 100 shown in FIG. 1 will be described with reference to FIG. 2.

The lens unit 150 is an interchangeable lens that is attachable to and detachable from the digital camera 100. A lens 103 includes a plurality of lenses for forming an optical image (object image) from object light that has been reflected by an object. Note that in the example shown in FIG. 2, only one lens is shown for simplicity.

A communication terminal 6 is a communication terminal that is intended for the lens unit 150 to communicate with the digital camera 100. Once the communication terminal 6 provided in the lens unit 150 and a communication terminal 10 provided in the digital camera 100 have been electrically connected to each other, circuits inside the lens unit 150, such as a lens system control circuit 4, become capable of communicating with a system control unit 50 inside the digital camera 100. Therefore, the system control unit 50 can control the diaphragm position by communicating with the lens system control circuit 4 and a diaphragm driving circuit 2, and change the focus state of a real image by displacing the lens 103 via communication with a lens driving circuit 3.

A shutter 101 is, for example, a focal-plane shutter that can freely control an exposure period of the later-described image capturing unit 22 under control of the system control unit 50.

The image capturing unit 22 has an image capturing surface on which an object image (optical image) that has passed through the lens 103 is formed, and includes an image capturing device (image sensor) that outputs, through photoelectric conversion, electrical signals (analog signals) corresponding to the optical image on the image capturing surface. For example, a CCD (Charge Couple Device) or CMOS (Complementary MOS) sensor is used as the image capturing device.

An A/D converter 23 includes a signal conversion circuit that functions as a signal conversion unit, and converts the analog signals output from the image capturing unit 22 into digital signals.

An image processing unit 24 generates image data by performing predetermined computation processing including, for example, predetermined pixel interpolation processing, resize processing such as reduction, color conversion processing, and the like with respect to the digital signals from the A/D converter 23, or digital signals from a later-described memory control unit 15. The computation result obtained by the image processing unit 24 is used by the system control unit 50 to control the diaphragm position and control the lens position. Using image data, the image processing unit 24 further performs, for example, AWB (auto white balance) processing, processing for recognizing an object image, and area extraction processing of the TTL method.

The processing for recognizing an object image includes, for example, processing for recognizing only a face as a display range of the object image, or recognizing an area that also includes shoulders and a lower body part as the display range of the object image, in a case where an object has been recognized as a person or an animal. Furthermore, in order to reliably set an area that includes every hair on the head and body as the display range of the object image, a range that is slightly larger than a recognized area may be set as the display range of the object image. For this reason, the display range of the object image may substantially have the shape of a rectangle including an area of the object image, may substantially have the shape of an ellipse including the area of the object image, or may be a range obtained by substantially tracing the outline of the object, for example.

In the area extraction processing, the image processing unit 24 performs processing for extracting a display range of an object image from image data. In order to extract the display range of the object image, the image processing unit 24 may apply edge detection that utilizes luminance and color information of a displayed image, and may also distinguish the type of the object image through the processing for recognizing the object image and then extract the display range of the object image in accordance with the distinguished type. Furthermore, by utilizing distance measurement information (distance information) of an object measured by a non-illustrated distance measurement unit, the image processing unit 24 may set a range that is at a distance close to the distance to an object image at the line-of-sight position as the display range. This range of the object image extracted by the image processing unit 24 is utilized as a specific range in the later-described embodiment.

The memory control unit 15 is a memory control unit for exchanging data controlled by the system control unit 50 among the A/D converter 23, the image processing unit 24, and a memory 32. The digital signals output from the A/D converter 23 are written directly to the later-described memory 32 via the image processing unit 24 and the memory control unit 15, or via only the memory control unit 15.

The memory 32 is a storage unit that includes, for example, a volatile semiconductor memory and temporarily stores the digital signals that have been obtained by the image capturing unit 22 and converted by the A/D converter 23, and image data generated by the image processing unit 24. The memory 32 has a storage capacity sufficient to store a predetermined number of still images, and moving images and sounds of a predetermined length of time. Furthermore, the memory 32 also functions as a memory for image display (video memory). The digital signals and image data that have been written into the memory 32 are displayed by the rear display unit 28 and the EVF 29 via the memory control unit 15.

The rear display unit 28 performs display corresponding to a signal from the memory control unit 15. The EVF 29 includes a display panel arranged inside a viewfinder, and performs display in accordance with a signal from the memory control unit 15 in a case where the eye proximity detection unit 57 has detected eye proximity.

In the digital camera 100, the digital signals which have been obtained as a result of A/D conversion applied by the A/D converter 23 to the analog signals from the image capturing unit 22 and which have been recorded into the memory 32, are sequentially transferred to and displayed on the rear display unit 28 or the EVF 29. Consequently, live-view shooting display, which is real-time display, is realized.

A nonvolatile memory 56 is an electrically erasable and recordable read-only recording medium that includes, for example, a nonvolatile semiconductor memory, such as an EEPROM. Constants, a program, and the like for the operations of the system control unit 50 are stored in the nonvolatile memory 56. The program mentioned here denotes a program for executing processing indicated by the flowcharts that will be described later in the present embodiment (selected position control processing).

The system control unit 50 includes at least one processor or circuit, and functions as a control unit. The system control unit 50 executes the later-described selected position control processing and controls the entirety of the digital camera 100 by deploying the aforementioned program recorded in the nonvolatile memory 56 to a later-described system memory 52 and executing the program.

The system memory 52 is a readable and writable storage unit that includes, for example, a volatile semiconductor memory and temporarily stores constants and variables for the operations of the system control unit 50, the program that has been read out from the nonvolatile memory 56, and the like.

A system timer 53 is a time measurement unit that measures a period until the execution of auto power-off, which turns off the light of the rear display unit 28 to prevent the battery consumption in a case where it is determined that the photographer is not operating the digital camera 100, and an exposure period.

The mode changeover switch 60 and an operation unit 70 are operation units for inputting various types of operational instructions to the system control unit 50. As stated earlier, the mode changeover switch 60 switches among operation modes of the system control unit 50. The operation modes include, for example, the still image shooting modes and the moving image shooting modes.

Shooting modes included in the still image shooting modes include an auto shooting mode, an auto scene distinction mode, a manual shooting mode, a diaphragm priority mode (Av mode), a shutter speed priority mode (Tv mode), and a program AE mode (P mode). A shooting mode is changed in a case where the user has performed an operation of rotating the main electronic dial 71 after depressing the mode changeover switch 60. Similarly, the moving image shooting modes, too, may include a plurality of shooting modes.

As stated earlier, the first shutter switch 62 is turned ON and generates a first shutter switch signal SW1 during an operation performed on the shutter button 61 provided on the digital camera 100, that is to say, when the shutter button 61 is depressed halfway through (a shooting preparation instruction). Under the first shutter switch signal SW1, such shooting preparation operations as AF (autofocus) processing, AE (automatic exposure) processing, and AWB (auto white balance) processing are started. The second shutter switch 64 is turned on and generates a second shutter switch signal SW2 upon completion of an operation performed on the shutter button 61, that is to say, when the shutter button 61 is fully depressed (a shooting instruction). Under the second shutter switch signal SW2, the system control unit 50 starts shooting processing, from reading of analog signals from the image capturing unit 22 to writing of image data to the later-described recording medium 200.

The operation unit 70 includes various types of operation members as input units that receive a user operation, and includes at least such operation members as buttons and dials shown in FIG. 1. The operation unit 70 includes not only the touchscreen 70a, shutter button 61, and the like shown in FIG. 2, but also the main electronic dial 71, sub electronic dial 73, cross key 74, SET button 75, and moving image button 76. The operation unit 70 further includes the AE lock button 77, magnification button 78, reproduction button 79, menu button 81, microphone 82, and line-of-sight input start button 83 as well.

The out-of-viewfinder display unit 43 includes a display panel and displays, via an out-of-viewfinder display unit driving circuit 44, various setting values to be set at the time of shooting, including the shutter speed and the f-number.

A power control unit 80 is composed of a circuit that detects a power unit 30, which acts as a power source for driving the digital camera 100, a DC-DC converter, a switch circuit for switching among supply destinations of the power source, and the like, and detects whether a battery has been loaded, a type of the battery, and a remaining battery level. Furthermore, the power control unit 80 controls the DC-DC converter based on the detection results and an instruction from the system control unit 50, and supplies a necessary voltage to a supply destination at a necessary timing. The power unit 30 may include, for example, a primary battery (e.g., an alkaline battery or a lithium battery), a secondary battery (e.g., a NiCd battery, a NiMH battery, or a Li battery), an AC adapter, and so forth.

A recording medium I/F 18 is an interface for the later-described recording medium 200, which is a memory card, a hard disk, or the like. The recording medium 200 is, for example, an SD card, a FLASH® memory, a hard disk, or the like, and is a recording medium which is attachable to and removable from the digital camera 100 and which is intended to record shot images, such as a memory card. Note that the recording medium 200 may be provided inside the digital camera 100.

An orientation detection unit 55 detects the orientation of the digital camera 100 relative to the direction of gravity. Based on the orientation detected by the orientation detection unit 55, the system control unit 50 can output direction information indicating whether an image shot by the image capturing unit 22 is an image that has been shot with the digital camera 100 held horizontally or an image that has been shot with the digital camera 100 held vertically. The system control unit 50 can add the direction information output from the orientation detection unit 55 to image data. For example, an acceleration sensor, a gyroscope, or the like can be used as the orientation detection unit 55. Using an acceleration sensor or a gyroscope as the orientation detection unit 55 also enables detection of a motion of the digital camera 100 (whether the digital camera 100 is panned, tilted, lifted, or stationary).

An infrared light emitting diode 166 is a light emitting element for detecting the line-of-sight position of the user's eyeball (eye) in a state where the eye is in proximity to the eye proximity unit 16, and irradiates the user's eyeball (eye) 161 that is in proximity to the eye proximity unit 16 with infrared light by emitting the infrared light toward the outside of the eye proximity unit 16. The infrared light emitted by the infrared light emitting diode 166 is reflected by the eyeball (eye) 161, and the reflected infrared light arrives at a dichroic mirror 162.

The dichroic mirror 162 reflects only the infrared light perpendicularly relative to the direction of incidence, and allows visible light to pass therethrough. The reflected infrared light, whose optical path has been changed, forms an image on an image capturing surface of a later-described line-of-sight detection sensor 164 via a later-described image forming lens 163.

The image forming lens 163 is an optical member that composes a line-of-sight detection optical system, and forms an image of the reflected infrared light as an eyeball image on the later-described line-of-sight detection sensor 164. The line-of-sight detection sensor 164 is composed of an image capturing device, such as a CCD image sensor.

The line-of-sight detection sensor 164 photoelectrically converts the formed eyeball image into electrical signals, and outputs the electrical signals to a later-described line-of-sight detection circuit 165. Based on the output signals of the line-of-sight detection sensor 164, the line-of-sight detection circuit 165 detects the line-of-sight position of the user, and outputs detected information to the system control unit 50 and a gaze determination unit 170. As such, the dichroic mirror 162, image forming lens 163, line-of-sight detection sensor 164, infrared light emitting diode 166, and line-of-sight detection circuit 165 compose a line-of-sight detection unit 160, and the eye proximity unit 16 has the functions of a line-of-sight operation unit. Note that the line-of-sight detection unit 160 is not limited to the aforementioned example and may be configured in other ways, and predetermined thresholds may be changed arbitrarily.

Based on the outputs from the eye proximity detection unit 57 and the line-of-sight detection unit 160, the system control unit 50 can detect an operation performed on, or the state of, the eye proximity unit 16. For example, the system control unit 50 can detect a new detection of the line-of-sight of the user who has brought his/her eye in proximity to the eye proximity unit 16, that is to say, a start of a line-of-sight input. Also, the system control unit 50 can detect a state where the user who has brought his/her eye in proximity to the eye proximity unit 16 is performing a line-of-sight input, and a state where the user who has brought his/her eye in proximity to the eye proximity unit 16 is gazing. In the present embodiment, a state where the user is gazing is detected by the system control unit 50, for example, in a case where the line-of-sight position of the user has not exceeded a predetermined movement amount within a predetermined period. Furthermore, the system control unit 50 can detect a deflection of the line-of-sight via which an input had been performed by the user who has brought his/her eye in proximity to the eye proximity unit 16, that is to say, an end of a line-of-sight input. Meanwhile, the system control unit 50 can also detect a state where no line-of-sight input is performed by the user who has brought his/her eye in proximity to the eye proximity unit 16.

In a case where the system control unit 50 has detected a state where a line-of-sight input is performed or a state where the user is gazing, the system control unit 50 detects the line-of-sight position on a display screen of the EVF 29 based on a correspondence relationship between position information included in the detected information from the line-of-sight detection circuit 165 and display coordinates of the EVF 29. As such, the system control unit 50 functions as the line-of-sight detection unit for detecting the line-of-sight position on the display screen.

As stated earlier with reference to FIG. 1, the eye proximity detection unit 57 is the eye proximity detection sensor that detects a state where the eye (object) 161 is in proximity to the eye proximity unit 16 of the viewfinder (eye proximity), and a state where the eye has separated therefrom (eye separation) (proximity detection). In accordance with the state detected by the eye proximity detection unit 57, the system control unit 50 switches between display (a display state) and non-display (a non-display state) of the rear display unit 28 and the EVF 29. In a state where an eye is not in proximity (in a non-eye proximity state), the system control unit 50 causes the rear display unit 28 to perform display, and causes the EVF 29 not to perform display. On the other hand, in a state where an eye is in proximity (in an eye proximity state), the EVF 29 is caused to perform display, and the rear display unit 28 is caused not to perform display.

The eye proximity detection unit 57 can use, for example, an infrared proximity sensor, such as a photointerrupter, and can detect a state where some sort of object has come in proximity to the eye proximity unit 16 in which the EVF 29 is built. In a case where an object has come in proximity, infrared projected from a light projection unit (not illustrated) of the eye proximity detection unit 57 is reflected, and received by a light receiving unit (not illustrated) of the infrared proximity sensor. In a case where no object has come in proximity, infrared projected from the light projection unit of the eye proximity detection unit 57 is not received by the light receiving unit of the infrared proximity sensor. In this way, depending on whether the light receiving unit of the infrared proximity sensor has received light, the eye proximity detection unit 57 can detect an object whose eye has come in proximity to the eye proximity unit 16. Furthermore, after detecting eye proximity, the system control unit 50 determines that the eye proximity state is maintained until eye separation is detected. Then, after detecting eye separation, the system control unit 50 assumes that the non-eye proximity state is maintained until eye proximity is detected.

Note that although the foregoing description has been provided using an exemplary case where the infrared proximity sensor is used for eye proximity detection, another sensor may be used in the eye proximity detection unit 57 as long as it can detect a state where an eye or an object is in proximity that can be regarded as eye proximity.

A sound input unit 58 performs sound recognition processing with respect to a sound input from the microphone 82. The sound recognition processing identifies whether a sound input to the microphone 82 is some sort of operational instruction that has been issued by the user for the digital camera 100, or another sound or noise. Then, in a case where the input sound is the operational instruction for the digital camera 100, the content of this instruction is communicated to the system control unit 50, and the system control unit 50 executes the content of this operational instruction.

A communication unit 54 includes a communication circuit or a module, and can communicate with an external apparatus via wireless communication, such as Bluetooth® and a wireless LAN.

(Sequence of Operations Related to Selected Position Control Processing)

Figure 3A:
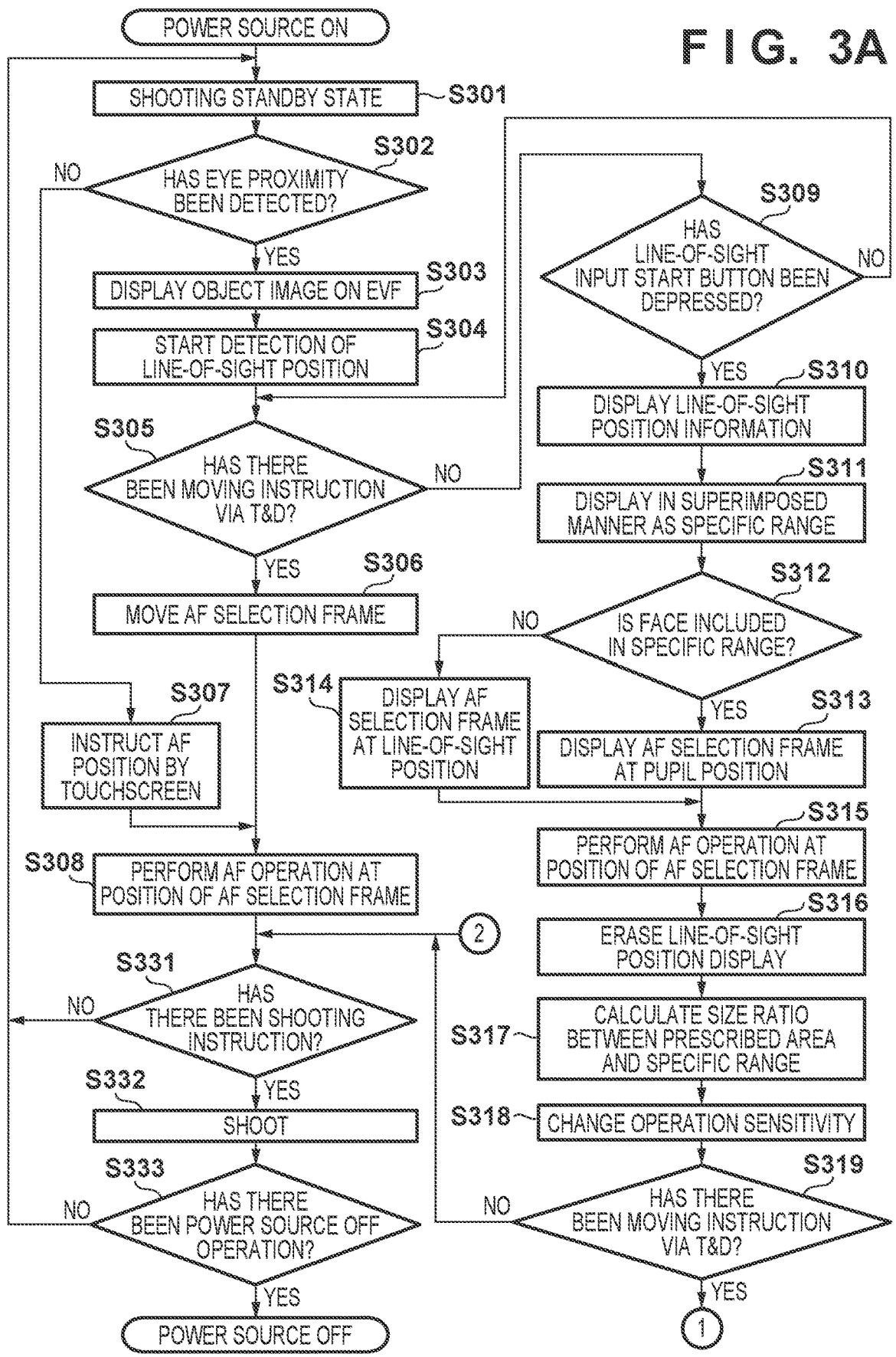
FIG. 3A is a flowchart (1) showing the operations of selected position control processing according to the present embodiment.
Figure 3B:
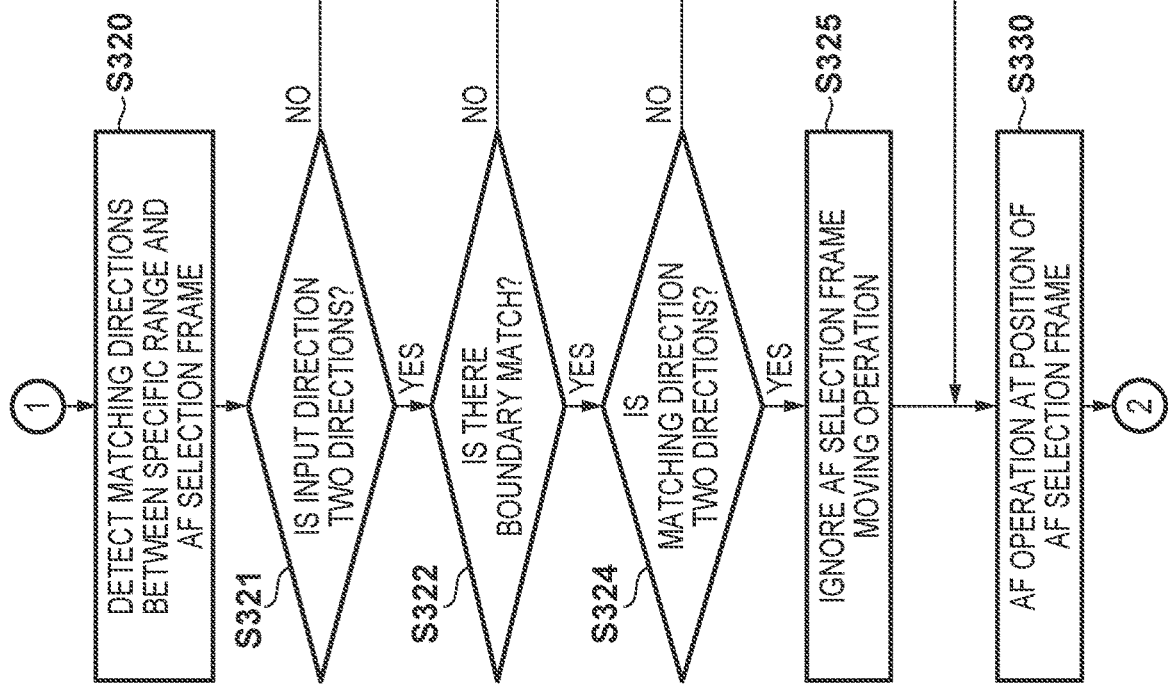
FIG. 3B is a flowchart (2) showing the operations of the selected position control processing according to the present embodiment.

Next, with reference to FIG. 3A, FIG. 3B, and FIG. 4, a description is given of a sequence of operations of the selected position control processing in the present embodiment. The selected position control processing is processing related to changing of the position of an AF selection frame via a line-of-sight input and a manual operation on the touchscreen (a touch operation and a drag operation), and realizes suppression of an erroneous operation, as well as an easy and highly accurate position selection, in selecting the position of an AF selection frame with respect to an object image. That is to say, by selecting the position of an AF selection frame 403 according to the present embodiment, the position on the object image at which an AF operation is to be performed can easily be set with high accuracy, which makes it possible to obtain a shot image that reflects the intention of the user to a greater extent. Note that the following description will be provided in relation to a mode in which a line-of-sight input unit is used as a first instruction unit, and a touch operation and a drag operation on the touchscreen are performed as a second instruction unit.

However, the first instruction unit and the second instruction unit are not limited to the line-of-sight input, touch operation, and drag operation.

Furthermore, the following description will be provided with reference to FIG. 4 in connection with a relationship between the object image and the position of the AF selection frame when changing the selected position via a line-of-sight input and a manual operation (a touch operation and a drag operation) according to the present embodiment. FIGS. 4A to 4E will be described using an exemplary case where a specific range 402a is used as a first position area, and a specific range 402b is used as a second position area. However, the first position area and the second position area are not limited to the specific ranges 402a and 402b. Note that the EVF 29 may display a combination of various types of information, such as the f-number, the shutter speed, and the number of images that can be shot, in addition to the information shown in FIG. 4A to FIG. 4E.

Note that the sequence of operations of the selected position control processing shown in FIG. 3A and FIG. 3B is realized by the system control unit 50 deploying the program recorded in the nonvolatile memory 56 to the system memory 52 and executing the program, unless specifically stated otherwise. Furthermore, this processing is started upon activation of the digital camera 100 in response to a user's operation on the power switch 72 of the digital camera 100.

In step S301, the system control unit 50 causes the digital camera 100 to make a transition to the shooting standby state. In the shooting standby state, the system control unit 50 can perform control so as to carry out various operations corresponding to the operations performed on the touchscreen 70a.

In step S302, the system control unit 50 determines whether the eye proximity detection unit 57 has detected a state where the user has brought his/her face in proximity (i.e., his/her eye has come in proximity) in order to look through the EVF 29. In a case where the system control unit 50 has determined that eye proximity has been detected, processing proceeds to step S303; otherwise, processing proceeds to step S307.

In step S303, the system control unit 50 causes the rear display unit 28 to stop performing display, and also causes the EVF 29 to start displaying an object image.

In step S304, the system control unit 50 causes the line-of-sight detection unit 160 to start the line-of-sight detection.

In step S305, the system control unit 50 determines whether a moving instruction for the position of the AF selection frame has been issued via a manual operation (a touch operation or a drag operation: T & D) performed by the user on the touchscreen 70a. For example, the system control unit 50 determines that the moving instruction has been issued in a case where the movement amount of the touch made by the user on the touchscreen 70a is equal to or larger than a predetermined amount. In a case where the system control unit 50 has determined that the moving instruction has been issued, processing proceeds to step S306; otherwise, processing proceeds to step S309.

In step S306, the system control unit 50 moves the AF selection frame 403 to the position in accordance with the instruction of step S305.

In step S307, the system control unit 50 moves the AF selection frame 403 based on a moving instruction issued via a manual operation (a touch operation or a drag operation: T & D) performed by the user on the touchscreen 70a.

In step S308, the system control unit 50 performs an AF operation at the position of the AF selection frame 403.

In step S309, the system control unit 50 determines whether an operation of depressing the line-of-sight input start button 83 has been performed. In a case where the system control unit 50 has determined that the line-of-sight input start button 83 has been depressed, processing proceeds to step S310; otherwise, processing returns to step S305.

Figure 4A:
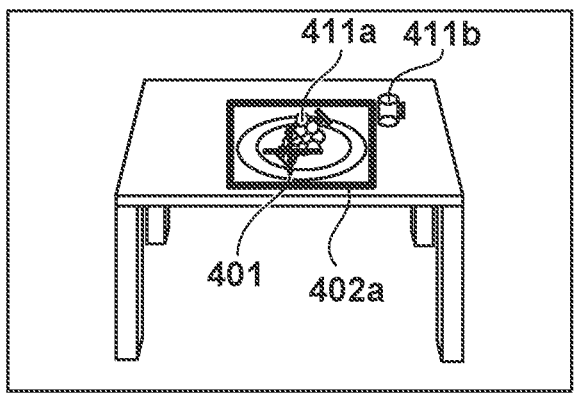
FIGS. 4A to 4E are diagrams illustrating examples of control of the position of an AF selection frame according to the present embodiment.

In step S310, the system control unit 50 displays a line-of-sight position display 401 superimposed on a live-view display of the EVF 29 as shown in, for example, FIG. 4A in accordance with information of the line-of-sight position (also referred to as the input position) detected by the line-of-sight detection unit 160.

Now, refer to FIG. 4A. FIG. 4A shows object images 411a and 411b displayed on the EVF 29. In a case where the user is looking at the object image 411a, based on the information of the line-of-sight position detected by the line-of-sight detection unit 160, the system control unit 50 displays the line-of-sight position display 401 and the specific range 402a superimposed on the object image 411a, which is the line-of-sight position of the user.

In step S311, the image processing unit 24 performs processing for extracting the object image located at the line-of-sight position, and the system control unit 50 displays this object image as the specific range 402a superimposed on the EVF 29.

In step S312, in accordance with an instruction from the system control unit 50, the image processing unit 24 determines whether a face is included in the specific range 402a extracted in step S312. In a case where the image processing unit 24 has determined that a face is included, the system control unit 50 causes processing to proceed to step S313; otherwise, the system control unit 50 causes processing to proceed to step S314. Note that the determination about whether a face is included in the specific range 402a may be made by the system control unit 50 by using the result of the extraction processing executed by the image processing unit 24 in step S311.

In step S313, the system control unit 50 displays the AF selection frame 403 superimposed on the position of a pupil of the face included in the specific range 402a. Note that known techniques can be used in facial detection and pupil detection, and thus the details of these detections are omitted.

In step S314, the system control unit 50 displays the AF selection frame 403 at the line-of-sight position based on the information of the line-of-sight position detected by the line-of-sight detection unit 160. For example, the system control unit 50 displays the AF selection frame 403 superimposed on the line-of-sight position display 401 displayed on a display image of the EVF 29.

Figure 4B:
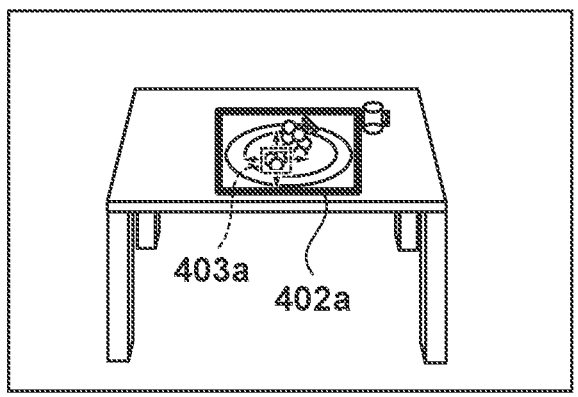

Now, refer to FIG. 4B. FIG. 4B shows an AF selection frame 403a displayed inside the specific range 402a. The image processing unit 24 recognizes that the range of the object image 411a is the specific range 402a, and the system control unit 50 displays the AF selection frame 403a at the line-of-sight position. It is possible to perform an operation of moving this AF selection frame 403a in any of the upward, downward, leftward, and rightward directions via a touch operation and a drag operation performed by the user on the touchscreen.

In a case where the line-of-sight position display 401 was located on a lower left portion of the object image 411a, the AF selection frame 403a is displayed at the position that is substantially the same as the position of the line-of-sight position display 401 of FIG. 4A, which was located on a lower left portion of the object image 411a.

In this way, through processing up to step S314, based on the line-of-sight of the user relative to a display image that has been displayed, the system control unit 50 determines a specific position (a line-of-sight position or a pupil position) on the display image as a selected position for achieving focus at the time of image capture (the position of the AF selection frame).

In step S315, the system control unit 50 performs an AF operation with respect to the object image at the position of the displayed AF selection frame 403. Here, in a so-called servo AF operation in which the position of the AF selection frame 403 moves so as to track the movement of the object image, the positions of the specific range 402a and the AF selection frame 403 make a tracking movement in the same direction by the same amount. During this tracking movement, the relationship between the positions relative to each other is maintained, and is changed only by a user operation performed in later-described step S319.

In step S316, the line-of-sight position display 401 displayed in step S310 is erased. In step S317, in accordance with an instruction from the system control unit 50, the image processing unit 24 calculates a size ratio between the specific range 402a and a prescribed area, which is the range of the entire display image. The image processing unit 24 calculates the size ratio with use of such information as the number of pixels in the horizontal direction, the number of pixels in the vertical direction, and the total number of pixels inside the area with respect to each of the two areas.

In step S318, the system control unit 50 changes the operation sensitivity of the touchscreen 70a based on the size ratio calculated in step S317. The operation sensitivity will be described later with reference to FIG. 4E.

In the following steps S319 to S330, the system control unit 50 adjusts the position of the AF selection frame to a desired position by moving the determined selected position (the position of the AF selection frame) via a user operation that has been performed via an instruction member, such as the touchscreen 70a. At this time, even in a case where the user operation for the selected position includes an erroneous operation, the system control unit 50 controls the movement of the selected position so that the selected position does not go outside the specific range 402a (or the object area). While the details will be described later, for example, the system control unit 50 permits or does not permit the movement of the selected position via this user operation in accordance with whether the selected position to be moved has reached a boundary of the specific range 402a.

In step S319, the system control unit 50 determines whether there has been an operation of selecting the position of the AF selection frame 403 via a touch operation and a drag operation of the user. In a case where the system control unit 50 has determined that the operation of selecting the position has been performed by the user, the system control unit 50 detects an operation amount, and processing proceeds to step S320; otherwise, processing proceeds to step S331. Note that after receiving the user operation, the system control unit 50 may disable the reception of a line-of-sight input for a predetermined period (stop the detection of the user's line-of-sight) so that the line-of-sight input does not interrupt the adjustment of the selected position via the user's manual operation.

In step S320, the system control unit 50 identifies the boundary positions of the specific range 402a and the AF selection frame 403a, and detects whether the boundary positions in the up, down, left, and right directions match.

Figure 4C:
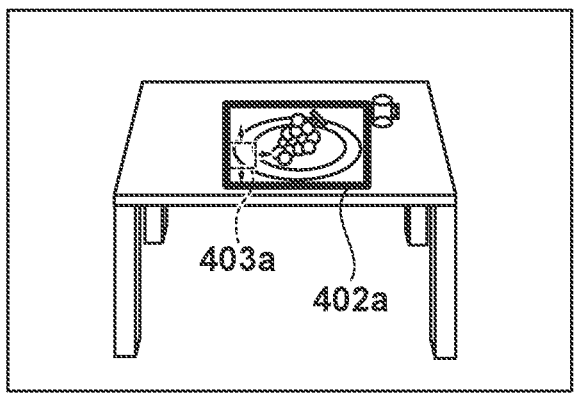

Now, refer to FIG. 4C. FIG. 4C shows the AF selection frame 403a located at the left edge of the specific range 402a. In this case, as the left-side boundaries of the AF selection frame 403a and the specific range 402a match, the system control unit 50 does not move the AF selection frame 403a in the leftward direction even if the user's touch operation and drag operation in the leftward direction have been received. On the other hand, in a case where the user has performed a moving operation in the direction other than toward the left side, for example, in the upward direction, the system control unit 50 moves the AF selection frame 403a in the upward direction. Therefore, in the example shown in FIG. 4C, the system control unit 50 detects that the left-side boundaries of the specific range 402b and the AF selection frame 403a match, and the boundaries do not match in the up, down, and right directions.

Figure 4D:
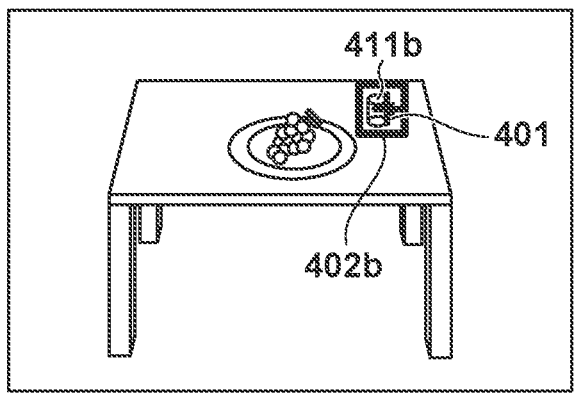

FIG. 4D shows that, along with the movement of the user's line-of-sight position from FIG. 4C, the line-of-sight position display 401 has moved to the post-movement line-of-sight position, and the object image 411b has been as the specific range 402b.

Figure 4E:
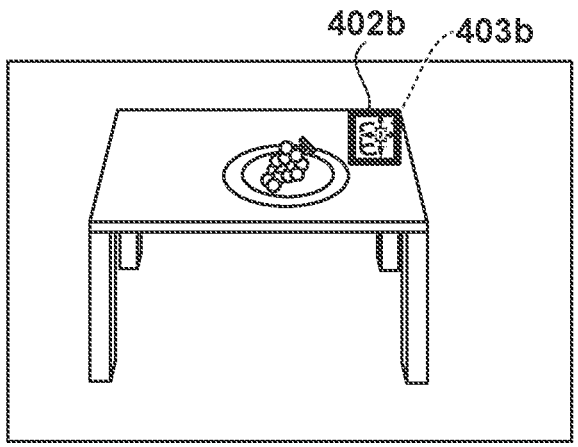

FIG. 4E shows the AF selection frame 403b displayed inside the specific range 402b. The specific range 402b shown in FIG. 4E is smaller than the specific range 402a shown in FIG. 4B. In this case, in a case where the size of the specific range is small, the system control unit 50 can finely move the selected position inside the specific range 402b by lowering the operation sensitivity of the AF selection frame 403b. That is to say, the AF selection frame 403b (selected position) can be moved with high accuracy by changing the sensitivity of a user operation relative to the movement of the selected position in accordance with size information of the specific range (e.g., an object image located at the selected position). Here, the operation sensitivity is a ratio of the movement amount of the AF selection frame to the movement amount of a finger used in the user's touch operation and drag operation. The smaller this ratio is, the lower the operation sensitivity becomes, and the easier the highly accurate position selection can be performed. For example, assume a case where the specific range has 500× 1000 pixels, and the entire screen has 3000×2000 pixels. In this case, using 1 as the movement amount before changing the operation sensitivity, the operation sensitivity is set by "using a movement amount of 1/12 for an area ratio of 1/12", "using a movement amount of 1/6 for a length ratio of 1/6 in the horizontal direction", "using a movement amount of 1/2 for a length ratio of 1/2 in the vertical direction", and so forth.

In step S321, the system control unit 50 determines whether the input operation received in step S319 involves two directions (i.e., includes components of two directions) (in a case where the input operation is decomposed into components of four directions, namely the upward, downward, leftward, and rightward directions). For example, in a case where the direction of the input was upper left, the system control unit 50 determines that the input includes components of two directions, namely the upward and leftward directions. In a case where the system control unit 50 has determined that the input operation involves two directions, processing proceeds to step S322; otherwise (only one direction), processing proceeds to step S323.

In step S322, the system control unit 50 compares the directions of the input operation as the operation of selecting the position of the AF selection frame detected in step S319 with the direction(s) of matching boundary positions detected in step S320, and determines whether these two types of directions match. In a case where the system control unit 50 has determined that they match at least in one direction, processing proceeds to step S324. In a case where it is determined that they match in neither of the two directions, processing proceeds to step S327.

In step S323, the system control unit 50 compares the direction of the input operation as the operation of selecting the position of the AF selection frame detected in step S319 with the direction(s) of matching boundary positions detected in step S320, and determines whether the two types of directions, namely the direction of the input operation and the direction(s) of matching boundary positions match. In a case where the system control unit 50 has determined that the direction of the input operation and the direction(s) of matching boundary positions match, processing proceeds to step S328; otherwise, processing proceeds to step S329.

In step S324, the system control unit 50 determines whether the two types of directions were determined to match in both of the two directions in step S322. In a case where the system control unit 50 has determined that the two types of directions match in the two directions, processing proceeds to step S325; otherwise, processing proceeds to step S326.

In step S325, the system control unit 50 regards the input operation received in step S316 as invalid. As a result, the AF selection frame 403a does not move; thus, the AF selection frame 403a does not move to the outside of the specific range 402b.

In step S326, the system control unit 50 moves the AF selection frame 403a in accordance with the amount of the input operation in step S319 only in the direction in which the two types of directions did not match according to the determination of step S324.

In step S327, the system control unit 50 moves the AF selection frame 403a in accordance with the directions of the input operation and the amount of the input operation in step S319. In step S328, the system control unit 50 regards the input operation received in step S319 as invalid. As a result, the AF selection frame 403a does not move; thus, the AF selection frame 403a does not move to the outside of the specific range 402b.

In step S329, the system control unit 50 moves the AF selection frame 403a in accordance with the amount of the input operation in step S319. In step S330, the system control unit 50 performs an AF operation at the position of the AF selection frame 403a. Note that after the AF operation, the operation sensitivity that was changed in step S318 is restored to the sensitivity before the change.

In step S331, the system control unit 50 determines whether the second shutter switch signal SW2 has been received. When the system control unit 50 has determined that the second shutter switch signal SW2 has been received, processing proceeds to step S332; otherwise, it is assumed that the digital camera is in the shooting standby state, and processing returns to step S301.

In step S332, the system control unit 50 executes shooting processing of the digital camera 100. In step S333, the system control unit 50 determines whether the power switch 72 has been operated by the user. In a case where the system control unit 50 has determined that the power switch 72 has been operated, the sequence of operations of the present processing is ended. On the other hand, in a case where the system control unit 50 has determined that the power switch 72 has not been operated, it is assumed that the state of the digital camera is the shooting standby state, and processing returns to step S301.

As described above, in the present embodiment, a positional input to the intra-finder display unit 29 is received, and a moving instruction for moving the selected position in a specific range based on an object image located at the position corresponding to the received input is received. Then, in a case where the selected position before the movement is inside the specific range and has not reached a boundary of the specific range in a first direction, the selected position is moved in the first direction in accordance with a moving instruction operation for the selected position in the first direction. Also, in a case where the selected position before the movement is inside the specific range and has reached a boundary of the specific range in the first direction, control is performed so that the selected position is not moved in the first direction even if a moving instruction operation has been performed for the selected position in the first direction. That is to say, in accordance with whether the selected position to be moved has reached a boundary of the specific range 402a, the system control unit 50 permits or does not permit the movement of this selected position via a user operation. In this way, the operability can be improved in selecting a position inside an image in connection with an operation of achieving focus.

Furthermore, in the present embodiment, in accordance with the size of an object image located at the selected position, the sensitivity at which a user operation is received with respect to the movement of the selected position is changed. In this way, the selected position can be moved with high accuracy.

Exemplary Modifications

The above embodiment has been described using an exemplary case where the user performs an operation with use of the touchscreen 70a and the line-of-sight detection circuit 165 while looking through the EVF 29. However, the configuration according to the present embodiment is not limited to this example. The following describes exemplary modifications of the configuration according to the present embodiment.

The aforementioned first instruction unit is not limited to using a line-of-sight input, and may be configured in other ways as long as it can designate an absolute position of a specific position in an image capturing range. For example, it is permissible to use sound-based inputting of a name with use of the microphone 82, inputting of a position via a touch on an object image with use of the touchscreen 70a, and so forth. In this case, the system control unit 50 uses the position which has been designated by the sound input and at which an object image is displayed, or the position of the touch input, instead of the line-of-sight position in step S310.

The second instruction unit is not limited to using a touch operation and a drag operation on the touchscreen 70a, and may be configured in other ways as long as it can designate the direction of movement of the AF selection frame 403. For example, it is permissible to use a directional instruction based on a sound input with use of the microphone 82, an operation of depressing the cross key 74, and so forth. In this case, the system control unit 50 uses a moving instruction based on the direction designated by a sound or the direction of depression of the cross key 74 instead of an instruction about a moving direction based on a touch operation and a drag operation in step S319.

Furthermore, the present embodiment may be used for a digital camera that is operated by a user while the user is looking at the rear display unit 28. In this case, for example, the first instruction unit may be a sound input that uses the microphone 82, and the second instruction unit may be an operation performed via the cross key 74. Also, instead of extraction of an object area based on line-of-sight position information, the sound input unit 58 may recognize the content of an instruction based on information input from the microphone 82, and the image processing unit 24 may extract an object image and display, for example, the specific range 402*a* superimposed on a live-view display on the rear display unit 28. Furthermore, the system control unit 50 may execute an operation of moving the AF selection frame 403 based on the input direction of the cross key 74 instead of a touch operation and a drag operation.

In addition, in a case where the first instruction unit does not use a line-of-sight input as in the aforementioned exemplary modification, the EVF 29 may not be installed in the digital camera 100. In this case, the system control unit 50 can proceed from step S301 to step S305, and skip processing of step S302 to step S304. Furthermore, in step 306 onward, the system control unit 50 executes an operation based on a sound input instruction issued via a sound input to the microphone 82 as the first instruction unit instead of an operation based on the line-of-sight detection unit 160.

Also, the examples shown in FIG. 4A to FIG. 4E have been described using an exemplary case where the line-of-sight position display 401 has a cross shape. However, the line-of-sight position display 401 may have a circular shape or a quadrilateral shape instead of the cross shape, or may not be displayed. In a case where the line-of-sight position display 401 is not displayed, the user can recognize the movement of his/her own line-of-sight position due to, for example, the movement of the position of the AF selection frame 403 in accordance with the movement of the line-of-sight position.

Also, the operation of starting a selected position instruction performed by the line-of-sight detection unit 160 may be, for example, a sound input instruction for the microphone 82 or depression of other arbitrary buttons, rather than an operation of depressing the line-of-sight input start button 83. In the case of the sound input instruction, the system control unit 50 may start receiving an instructional operation based on a line-of-sight input in a case where a sound-based speech indicating a start of a selection operation with use of a line-of-sight, such as "start a line-of-sight input" and "select a position with an eye", is detected in a sound detected by the microphone 82. Furthermore, in a case where the instruction is the depression of other buttons, the reception of an instructional operation based on a line-of-sight input may be started, for example, upon depression of an arbitrary button other than the line-of-sight input start button 83. Alternatively, the system control unit 50 may switch between ON and OFF of the constant reception of an instructional operation based on a line-of-sight input from a menu screen that is displayed by depressing the menu button 81.

Furthermore, while the size of the specific range 402 is compared with the size of the prescribed area, the prescribed area need not be the entire display image. For example, it may be a fixed region, or may be changed each time the comparison is performed, such as "the specific range 402 that was selected immediately before". A specific example is described below. First, assume a state where processing returns to step S301 after processing from step S301 to step S319 has been performed, and step S319 to step S330 have been further performed, in accordance with an instruction from the system control unit 50. At this time, the object image 411*a* is selected as the specific range 402*a* as in FIG. 4B.

Next, in step S310, the line-of-sight position moves to the object image 411*b* and the line-of-sight position display 401 is displayed superimposed on the object image 411*b* as in FIG. 4D. Furthermore, the specific range 402*b* is also displayed in a superimposed manner in step S311. At this time, in a case where the prescribed area is defined as "the specific range 402 that was selected immediately before", the specific range 402*a* serves as the prescribed area. Thereafter, the AF selection frame 403*b* is displayed in a superimposed manner in step S313 or step S314 as in FIG. 4E, and the operation sensitivity is changed based on the comparison between the specific range 402*a* and the specific range 402*b* in step S317.

Also, the operation of step S319 has been described using an exemplary case where the operation of selecting the position of the AF selection frame 403 is received via a touch operation and a drag operation. At this time, in response to the reception of this user operation, the system control unit 50 may enlarge a display on the EVF 29 so that the display includes the entirety of the specific range 402. In a case where the enlarged display is performed, the system control unit 50 also changes the operation sensitivity of the second instruction unit. An arbitrary appropriate value may be used as the ratio of the size of the specific range 402 before and after the enlarged display. The operation sensitivity after the enlargement is changed at a ratio that is substantially the same as the foregoing ratio. For example, in a case where the specific range 402 is displayed in such a manner that it has been enlarged twofold both upward and downward, the movement amount of the AF selection frame 403 relative to the operation amount is increased twofold both upward and downward by the system control unit 50. In this way, the AF selection frame 403 can be finely moved in accordance with a user operation, and thus the position of the AF selection frame 403 can be designated with higher accuracy.

Furthermore, step S321 has been described using an example in which boundary positions of the specific range 402 and the AF selection frame 403 are identified, and whether they match in each of the upward, downward, leftward, and rightward directions is determined. However, it is sufficient to be able to determine whether the AF selection frame 403 is located in the vicinity of a boundary of the specific range 402. For example, in a case where a part of the AF selection frame 403 exists outside the specific range 402, a boundary of the AF selection frame 403 and a boundary of the specific range 402 share a point of intersection. Boundary positions may be determined to match in a state where this point of intersection exists. Also, boundary positions may be determined to match in a case where the AF selection frame 403 is located in the vicinity of a boundary of the specific range 402, for example, located at a position that is within 20% from the left edge of the specific range 402. This is because it is assumed that, as the AF selection frame 403 is in the vicinity of the left-side boundary of the specific range 402, performing an operation several times will easily make boundary positions match.

Note that the foregoing description has been provided using an exemplary case where the specific range is set based on the range of an object image. However, the specific range may be a range of a predetermined size which is a size irrelevant to the object image.

Although the foregoing embodiment has been described using an exemplary case where the user changes the position of the AF selection frame, the item to be changed need not be the AF selection frame. For example, it is permissible to use a unit that allows the user to designate the position at which AE measurement for determining exposure is performed, or the position related to other parameters that can be changed on the digital camera 100.

Note that various types of control that have been described above as being performed by the system control unit 50 may be performed by one item of hardware, or the entire apparatus may be controlled by a plurality of items of hardware sharing processing.

Furthermore, although the present invention has been described in detail based on a preferred embodiment thereof, the present invention is not limited to such a specific embodiment, and various modes within a range that does not depart from the principles of the present invention are also encompassed within the present invention. In addition, the foregoing embodiment merely illustrates one embodiment of the present invention, and different embodiments may be combined as appropriate.

Furthermore, while the foregoing embodiment has been described using an exemplary case where the present invention is applied to a digital camera, no limitation is intended by this example, and the present invention is applicable to a device that includes an image capturing unit. That is to say, the present invention is applicable to, for example, an electronic device provided with a display apparatus, such as a personal computer, a PDA, a mobile telephone terminal, a mobile image viewer, a game device, a tablet terminal, a smartphone, and a head-mount display.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-122348, filed Jul. 16, 2020 which is hereby incorporated by reference herein in its entirety.

What is claimed is:

1. An apparatus, comprising
at least one memory and at least one processor which function as:
a first instruction unit configured to be capable of receiving an input of a position to a display unit;
a second instruction unit configured to be capable of receiving a moving instruction for moving a selected position corresponding to the input position on the display unit whose input has been received by the first instruction unit; and
a control unit configured to perform control to
in a case where an object area including the input position has a first size, move the selected position by a first movement amount in accordance with a moving operation of a first operation amount performed with respect to the second instruction unit, and
in a case where the object area has a second size that is smaller than the first size, move the selected position by a second movement amount smaller than the first movement amount in accordance with the moving operation of the first operation amount performed with respect to the second instruction unit.

2. The apparatus according to claim 1,
wherein a magnitude of a movement amount of the selected position relative to an operation amount for the second instruction unit is determined by comparing an entire screen with size information of a specific range.

3. The apparatus according to claim 2,
wherein the size information is at least one of a length of the specific range in a horizontal direction, a length of the specific range in a vertical direction, and an area of the specific range.

4. The apparatus according to claim 1,
wherein the control unit performs control so that
in a case where the selected position before movement is inside the object area and has not reached a boundary of the object area in a first direction, the selected position is moved in the first direction in accordance with an operation of issuing, to the second instruction unit, a moving instruction for the selected position in the first direction, and
in a case where the selected position before movement is inside the object area and has reached a boundary of the object area in the first direction, the selected position is not moved in the first direction even when the operation of issuing, to the second instruction unit, the moving instruction for the selected position in the first direction has been performed.

5. The apparatus according to claim 1,
wherein the object area is an area corresponding to an object that has been detected at the input position input by the first instruction unit.

6. The apparatus according to claim 1,
wherein the first instruction unit is one of a line-of-sight input unit configured to receive a line-of-sight input which is an input of a position performed with respect to an object image via a line-of-sight, a sound input unit configured to receive an input of a name performed with respect to an object image via a sound, and a touch input unit configured to receive a touch input which is an input of a position performed with respect to an object image via a touch.

7. The apparatus according to claim 1, wherein after the object area based on the first instruction unit has been determined, the object area moves while tracking a movement of an object image.

8. The apparatus according to claim 1, wherein the object area is determined based on distance measurement information of an object that has been detected at the input position input by the first instruction unit.

9. The apparatus according to claim 1, wherein in a case where an object image includes a pupil, a position whose input has been received by the first instruction unit is used as a pupil position.

10. The apparatus according to claim 1, wherein the object area is a range which includes an object image at a position whose input has been received by the first instruction unit, and which substantially has a shape of a rectangle, substantially has a shape of an ellipse, or is obtained by substantially tracing an outline of an object.

11. The apparatus according to claim 1, wherein in a case where an instruction from the second instruction unit has been started, the control unit does not receive an input from the first instruction unit for a predetermined period.

12. The apparatus according to claim 1, wherein the display unit includes a display panel arranged inside a viewfinder.

13. The apparatus according to claim 1, wherein the control unit controls the display unit so that an image showing the object area corresponding to the input position is displayed superimposed on a live-view image shot by an image capturing unit.

14. The apparatus according to claim 13, wherein the control unit causes the display unit to display an image indicating the selected position.

15. A control method for an apparatus that includes a first input device configured to be capable of receiving an input of a position to a display device and a second input device configured to be capable of receiving a moving instruction for moving a selected position corresponding to the input position on the display device whose input has been received by the first input device, the control method comprising:
performing control to
in a case where an object area including the input position has a first size, move the selected position by a first movement amount in accordance with a moving operation of a first operation amount performed with respect to the second input device, and
in a case where the object area has a second size that is smaller than the first size, move the selected position by a second movement amount smaller than the first movement amount in accordance with the moving operation of the first operation amount performed with respect to the second input device.

16. A non-transitory computer readable storage medium storing a program for causing a computer to execute a control method of an apparatus comprising a first input device configured to be capable of receiving an input of a position to a display device and a second input device configured to be capable of receiving a moving instruction for moving a selected position corresponding to the input position on the display device whose input has been received by the first input device, the control method comprising:
performing control to
in a case where an object area including the input position has a first size, move the selected position by a first movement amount in accordance with a moving operation of a first operation amount performed with respect to the second input device, and
in a case where the object area has a second size that is smaller than the first size, move the selected position by a second movement amount smaller than the first movement amount in accordance with the moving operation of the first operation amount performed with respect to the second input device.

* * * * *